Sept. 23, 1941.  L. F. ROWE ET AL  2,256,528
MATERIAL FOR POLISHING, CLEANING, OR THE LIKE
AND METHOD OF MAKING THE SAME
Filed May 1, 1939
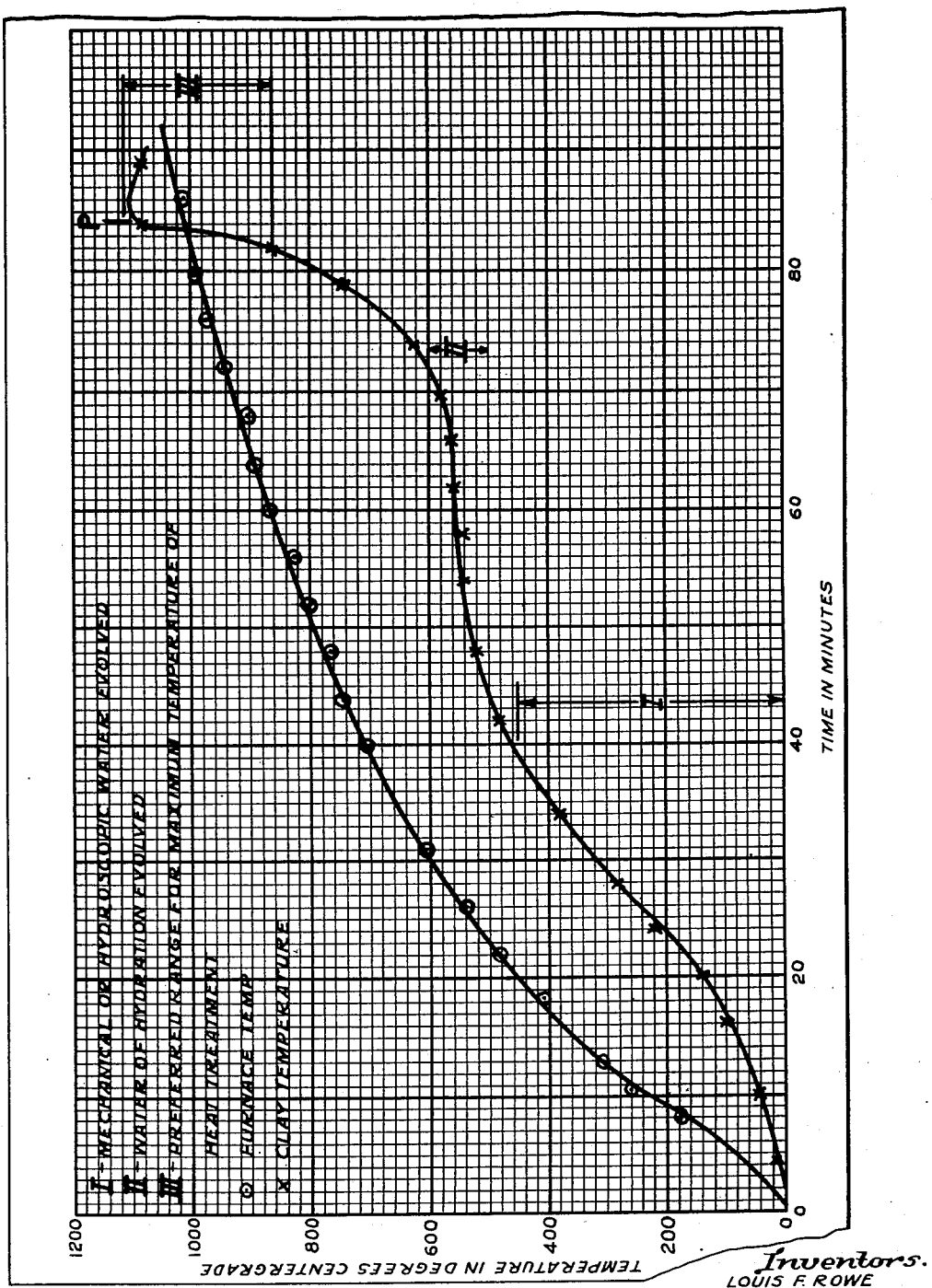
Inventors.
LOUIS F. ROWE
ALEXIS G. PINCUS
CARL G. SILVERBERG
Harry H. Styll
Attorney.

Patented Sept. 23, 1941

2,256,528

UNITED STATES PATENT OFFICE 2,256,528

MATERIAL FOR POLISHING, CLEANING, OR THE LIKE AND METHOD OF MAKING THE SAME

Louis F. Rowe, Southbridge, and Carl G. Silverberg, Brookfield, Mass., and Alexis G. Pincus, State College, Pa., assignors to American Optical Company, Southbridge, Mass., a voluntary association of Massachusetts Application May 1, 1939, Serial No. 271,210

8 Claims. (Cl. 51—307)

This invention relates to the provision of novel materials for polishing, cleaning or the like and process of making the same.

One of the principal objects of the invention is to provide a fine grain material with a relatively large available surface for mechanical and chemical uses and process of making the same.

Another important object of the invention is to provide a non-toxic and non-pigmenting polishing material and process of making the same.

Another important object of the invention is to provide a composition of matter which is a substitute for commercially known rouge (iron oxide) which has been the almost universal polishing medium, particularly for glass polishings; which does not stain or discolor objects with which it comes in contact; such as skin, clothing, furniture, buildings, floors, etc.; which does not constitute a health hazard; which is relatively low in cost; and which imparts a polish of high quality within a reasonable time, and which is generally acceptable for commercial use as regards the texture of the polished surface.

Another important object is to produce a fine grain material applicable as a polishing material, in addition to many other uses, resulting from clay calcined to an appropriate temperature and thereafter reducing said calcined clay to a proper condition by suitable milling or the like and, in some instances, further treating said clay by a leaching or dissolving out process to remove undesirable soluble materials which might have injurious effects upon the polishing efficiency of the clay or other uses thereof.

Another object is to provide a novel method of treatment of natural clays to render them effective as polishing means or for other desirable uses by heating the said clays to temperatures above the range in which the water of constitution is evolved but below the range which leads to a material which objectionably scratches the surfaces which are to be treated by said clay product.

Other objects and advantages of the invention should become apparent from the following description taken in connection with the accompanying drawing and it will be apparent that many changes may be made in the arrangements and methods shown and described without departing from the spirit of the invention as expressed in the accompanying claims. It, therefore, is to be understood that the invention is not limited to the specific arrangements and methods shown and described, as the preferred forms only have been given by way of illustration.

Referring to the drawing:

The figure of the drawing shows a typical time-temperature diagram giving the corresponding temperatures of the material and of the furnace as heating progresses for a specified preferred material embodying the invention and indicating the temperature ranges in which various conversions take place for the given material and indicating the maximum temperature of heating preferred in this invention.

Considering said materials as polishing means, it has been usual in the past, in forming highly polished surfaces on glass or the like, to use an iron oxide known commercially as rouge. Although this rouge is practical, as regards its polishing characteristics, it has a decidedly undesirable staining nature, particularly as regards the clothing of the operator using such rouge, and the machinery, floors, ceilings or other parts of the building in which such polishing operations are carried on.

Many attempts have been made to overcome the disadvantages of rouge and yet attain its desirable polishing characteristics through the use of substitute polishing materials. One of these polishing materials has been made of finely powdered silica because of its natural color and because it does not stain. Silica, however, proved inferior to rouge, as regards its polishing characteristics and the type of polish obtained on the surface of glass articles. In addition to the above difficulties, silica has a decided disadvantage in that its use may involve a serious health hazard.

One of the prime objects, therefore, of the present invention is to completely overcome the above difficulties, as regards toxic and pigmenting conditions, through the provision of non-toxic and non-pigmenting polishing materials or alternate materials possessing one or more of the above characteristics and to provide fine grain material adaptable to many other uses.

For ease in describing the present invention, we will consider the invention as applied to polishing materials. In accordance with this invention, hydrated aluminium silicate (clay), as mined or mined and purified, is subjected to a controlled heat treatment, the limits of temperature and time of which have been determined previously by test or trial, for the purpose of producing a material suitable for use in polishing, either directly or after it has been milled or ground to break down aggregates, lumps or the like in said material, to reduce it so that no aggregates sufficiently large to interfere with the polishing action remain.

In setting forth the preferred form of the invention, a suitable clay is selected, that is, from a suitable source of supply, as for example, from Florida or Georgia, which clay is commercially known as Florida kaolin or Georgia kaolin. Kaolin is favored because of its freedom from sand, grit, etc. It is to be understood, however, that clay from many sources may be used, requiring in some instances, purification preceding or subsequent to the heat treatment. To simplify matters, therefore, throughout the further description of the preferred form of the invention, the broad term clay will be used.

The clay material passes through several well defined stages during the heat treatment. Theoretically these seem to be as follows:

First, during the initial heating of from room temperature to about 450° C., the mechanical and hygroscopic water is eliminated.

Secondly, the chemically combined water, if the chemical composition of the clay is $Al_2O_3.2SiO_2.2H_2O$, the $2H_2O$ is evolved or vaporized by an endothermic reaction (heat absorbing). Care should be exercised to separate this water of hydration without too rapid elevation in temperature so as to avoid sintering of particles together by the possible fluxing action of the water. Therefore, at the second stage, between 500 to 600° C. this $2H_2O$ should be substantially eliminated.

Thirdly, the heating is continued to break up the structure of the aluminium silicate to reduce it to the desired condition. Practical temperatures will be discussed later. At this stage the clay is reduced to a practical polishing material with the exception that perhaps some large aggregates might be present. These, however, are easily broken down through subsequent treatment, as by milling, rolling or the like. It is important, that the third stage of heating be not carried too far as the material will then not produce as good a polished surface.

The material resulting from the third stage of the heating is available as a crude polishing compound. It may be rendered still finer in texture, as by grinding or in any other manner breaking up the adherence between particles. It is, in general, desirable to thus improve the quality of the material, as these adhering particles if not broken down, tend to scratch the surface which is being polished by said material due to mechanical action. The limiting of the temperature to which the heating is carried, in this third stage, is important, as above set forth. We find that above 1350° C. the change into an undesirable structure begins to take place very rapidly so that the clay should not be heated above 1350° C. The temperature need not be carried as high as 1350° C. in order to effect the desirable transformation, as this action begins to take place at about 400° C. Within the range of 400° C. to 1350° C., the desired transformation takes place more rapidly and more completely as the temperature is elevated.

It has been found, through the use of samples of clay which have been prepared and tested by the standard tests which we use to evaluate polishing compounds, that the quality of polish obtained can be very well explained by the weight of glass which is removed from the test glass and by a general description of the appearance of the surface. In this test, a flat disc of glass is polished with the material under test under standard carefully controlled conditions. The table which follows sets forth some general results on a specific material, commercially known as United Clay Mines "Putnam clay," a Florida kaolin.

| Calcination | Temperature | Removal rate | Surface quality |
|---|---|---|---|
| °C. | °F. | Milligrams | |
| 482 | 900 | 4.2 | Poor. |
| 538 | 1000 | 15.6 | Do. |
| 593 | 1100 | 30.8 | Fair. |
| 648 | 1200 | 38.4 | Do. |
| 704 | 1300 | 41.0 | Good. |
| 760 | 1400 | 44.4 | Do. |
| 815 | 1500 | 45.6 | Do. |
| 871 | 1600 | 43.2 | Do. |
| 926 | 1700 | 36.0 | Fair. |
| 981 | 1800 | 37.2 | Do. |
| 1036 | 1900 | 36.0 | Do. |
| 1093 | 2000 | 45.4 | Poor. |
| 1204 | 2200 | 58.6 | Do. |
| 1315 | 2400 | 57.2 | Do. |
| 1427 | 2600 | 54.0 | Do. |
| 1510 | 2750 | 53.4 | Do. |

It will be noted, by the chart set forth above, that as calcination is stopped at 100° F. intervals between the 900° F. and 1500° F. the rate of removal and quality of the polished surface increases steadily to a maximum. It will be noted that from 900° to 1100° F. the surface quality is poor and rate of removal is relatively low. From 1100° F. to 1300° F., the rate of removal increases and the surface quality is better. From 1300° F. to 1600° F. the removal rate is relatively high and the surface quality good. The surface quality, however, between 1600° F. and 1700° F. commences to fall off and the removal rate also diminishes. This reduction of removal rate and change of surface quality from good to fair continues to approximately 1900° F. whereupon the surface quality then decreases to a very poor state although the rate of removal increases. This increased rate of removal is probably due to the crystalline structure which the material develops at such high temperature. By comparison of these removal rates, with the removal rates of the best polishing rouges, it is found that they are of the same order of magnitude. The polishing material, however, as produced by clay treated as specified above is non-toxic and non-pigmenting and is in this manner more desirable than rouge. Other clays have given even better results.

The duration of heating at the temperature chosen does not seem to be a very important factor beyond a reasonable time. Equivalent removal rates and surface quality were obtained whether the clay was held at the maximum temperature of calcination for two hours or for several days. Of course, the necessary length of time depends on how large a bulk of material is being heated and how easily the temperature gradient from the outside to the interior of the mass is smoothed out or equalized. As evidence for this point of consideration, batches of Florida clay were held at 1500° F. (815° C.) for the times given, as illustrated in the table below.

| Time | Rate of removal | Surface quality |
|---|---|---|
| Hours | Milligrams | |
| 0.5 | 47.2 | Fair to good. |
| 1.2 | 51.0 | Good. |
| 2 | 52.0 | Do. |
| 4 | 58.4 | Do. |
| 8 | 56.8 | Do. |
| 24 | 57.2 | Fair to good. |

If the heat is prolonged for too long a time the formation of some undesirable hard material seems to take place.

The material obtained at 1500° F. (815° C.) is very soft and fine-grained, but the particles do remain in friable lumps which must be broken up by some means.

To effect this breaking up suitable ball-milling or the like may be employed. The milling process may be carried on either wet or dry. It has been found, however, that wet milling is more desirable from the standpoint of avoiding caking up with the result that a more rapid milling action takes place. The material may be used in this condition or may be subjected to a subsequent drying process. It is important to note that although a wet milling is employed the clay does not reabsorb the liquid used in the milling process and decreases its polishing ability, that is, it does not have any tendency to return to its initial state; $Al_2O_3.2SiO_2.2H_2O$. Samples of said material have been retained in water for many months without deteriorating its polishing ability.

The time of milling depends upon the size and charging of the mill. It should be continued at least long enough to reduce all of the material to finer than 200 mesh, which is a standard accepted term used in screening.

The following clays which have been found practical for use are set forth herein only by way of illustration: Georgia and Florida clays or other sedimentary clays which have been freed from mica, feldspar, quartz or other accompanying gritty minerals through geological processes; as for example, by nature's transportation through flow of water or the like. Other clays may be used which have been freed by subsequent industrial processing from such accompanying minerals. It is to be understood, therefore, that the clays given here are only given by way of illustration.

The temperature controls and treatments given herein are set forth for rendering the various materials usable as polishing ingredients and such treatments may also apply for rendering the materials practical for other uses. In following out this treatment suitable temperature control must be obtained. For ease of description we have given the temperature controls of a particular clay (Florida kaolin) but it is to be understood that anyone skilled in the art could apply these teachings to other clays or other materials.

In following the steps of this heat treatment and in order to arrest it at the optimum point any of the techniques familiar in ceramic technology may be used. For the purposes set forth, the final test is always how the material will polish glass, but for other purposes other means for determining the optimum temperature for arresting the calcination may be desirable. We may mention changes in index of refraction, specific gravity, in the X-ray diffraction pattern, in the bulk weight, and the tendency to rehydrate. One of the most used and simpler methods for following the course of calcination is by measuring the differential rate of heating. In this method the clay, in a suitable container, is placed in a furnace. A thermocouple is embedded in the clay or other material and the temperature changes measured in comparison to that of the furnace as the temperature of the furnace is raised at a constant rate. This is diagrammatically illustrated in the figure of the drawing by a chart showing the differences in temperature. The temperatures of a Florida kaolin and the furnace in which it was heated are recorded at different time intervals for the duration of the heating. Referring to the curve A of the chart it may be seen that the maximum endothermic (heat absorbing) reaction takes place at about 600° C. after 70 minutes of total heating time. The evolution of heat takes place at about 1100° C. in 85 minutes, as illustrated at P on the chart; therefore, the temperature to which this material should be heated to obtain the optimum properties desirable for this purpose described is probably somewhat below 1100° C., let us say 925° to 1000° C. The curve A illustrates the temperature of the thermocouple which is embedded in the clay, the curve B illustrates the temperature of the thermocouple which is freely exposed to the furnace atmosphere. From curves of this type the desired maximum temperature of calcination can be determined for any of the materials set forth above. The finding of this method should then be checked by actual service test and corrected according to the results of said test.

Although the invention has been described as for use in polishing glass articles, materials resulting from this invention may be used for many other purposes such as a substitute for pumice to eliminate the scratching characteristics of pumice; for use in toothpaste; for use in purifying oils and other liquids in a manner for which charcoal or like is used; for use as filter means; for use in impregnating felts to produce dust filters; for use as a solid absorbent either in granular form or by bricketing; for use as a catalyst or carrier for catalysts; and for many other purposes.

In general it is desirable to obtain such a material that has no pigment so it will not stain, and also that is not toxic so it will not be a health hazard.

The procedure is to treat clay by heating it to a certain definite temperature that has been proven by test or trial to be the optimum, and then further treating it to remove impurities and scratchy particles. The consideration is to heat treat the material to a temperature that has been proven by trial or test to produce the best polishing results. The proper temperature and exposure for any material under consideration is obtained empirically by test and trial for that particular material.

Poisons may be removed in some cases by further heating, and in some cases poisons may be removed by washing.

The controlling factor is whether or not the material so operated upon proves on test to be adaptable for the results required. The limits of operation are empirically determined as has been stated above.

From the foregoing description it will be seen that a simple, efficient and economical means and methods have been provided for accomplishing all of the objects and advantages of the invention.

Having described our invention, we claim:

1. A material for use as a polisher, a cleanser, a purifier, a catalyst or a catalyst carrier or other uses comprising a fine grained, non-toxic, non-staining material resulting from the heat treatment of a batch of kaolinic clay for a time interval sufficient to heat the individual particles of clay to a temperature ranging between 1000° to 2100° F., with the temperature of the heat used in said treatment according to the particular batch of clay, being of a given amount within said range so as to be below the temperature point at which it will cause an appreciable portion of said clay to sinter into hard lumps and lose its effectiveness as a glass polisher as compared with rouge.

2. A material for use as a polisher, a cleanser, a purifier, a catalyst or a catalyst carrier or other uses comprising a fine grained, non-toxic, non-staining material resulting from the heat treatment of a batch of kaolinic clay for a time interval sufficient to heat the individual particles of clay to a temperature ranging between 1300° to 1600° F., with the temperature of the heat used in said treatment according to the particular batch of clay, being of a given amount within said range so as to be below the temperature point at which it will cause an appreciable portion of said clay to sinter into hard lumps and lose its effectiveness as a glass polisher as compared with rouge.

3. A material for use as a polisher, a cleanser, a purifier, a catalyst, or a catalyst carrier or other uses comprising a fine grained non-toxic, non-staining material of a physical state that will polish glass without scratching resulting from the heat treatment of a batch of kaolinic clay for a time interval sufficient to heat said clay to a given temperature ranging from 1000° to 2100° F. depending upon the particular type of clay used for said batch with the temperature so controlled according to the particular batch of clay as to be sufficient to develop a physical state of said individual particles that will polish glass with substantially the efficiency of rouge.

4. A material for use as a polisher, a cleanser, a purifier, a catalyst or a catalyst carrier or other uses comprising a fine grained, non-toxic, non-staining material of a physical state that will polish glass without scratching resulting from the heat treatment of a batch of kaolinic clay for a time interval sufficient to heat the individual particles of clay to a temperature ranging between 1000° to 2100° F., with the temperature of the heat used in said treatment according to the particular batch of clay, being of a given amount within said range so as to be adjacent to but below the temperature point which will cause an appreciable portion of said clay to sinter into hard lumps which are difficult, by subsequent processing, to break down to the polishing characteristics desired, the said given temperature being originally obtained by heat treatment of said clay to different temperatures within the above range and by trial of the materials, produced by said different temperatures, in polishing until a temperature is reached that trial of the material resulting therefrom in polishing a glass with said material demonstrates that said material will give the maximum non-scratching efficiency, surface quality producing nature and a speed of operation substantially equal to that of rouge.

5. The process of making a material for use as a polisher, a cleanser, a purifier, a catalyst or a catalyst carrier or other uses, comprising forming a fine grained non-toxic, non-staining material to a physical state that will polish glass without scratching by heat treating a batch of kaolinic clay for a time interval sufficient to heat the individual particles of clay to a temperature ranging between 1000° to 2100° F., with the temperature used in said treatment according to the particular batch of clay being of a given amount within said range so as to be adjacent to but below the temperature point which will cause an appreciable portion of said clay to sinter into hard lumps and lose its effectiveness as a glass polisher as compared with rouge.

6. The process of forming a material for use as a polisher, a cleanser, a purifier, a catalyst or catalyst carrier or other uses, comprising forming a fine-grained non-toxic, non-staining material to a physical state that will polish glass without scratching by heat treating a batch of kaolinic clay for a time interval sufficient to heat the individual particles of clay to a temperature ranging between 1000° to 2100° F., with the temperature used in said treatment, according to the particular batch of clay, being of a given amount within said range so as to be adjacent to but below the temperature point which will cause an appreciable portion of said clay to sinter into hard lumps which are difficult, by subsequent processing, to break down to the polishing characteristics desired, the said given temperature being originally obtained by heat treatment of said clay to different temperatures within the above range and by trial of the materials produced by said different temperatures, in polishing until a temperature is reached that trial of the material resulting therefrom in polishing a glass with said material demonstrates that said material will give the maximum non-scratching efficiency, surface quality producing nature and a speed of operation substantially equal to that of rouge.

7. A glass polishing material comprising a fine-grained, non-toxic, non-staining material of a physical state that will polish glass without scratching, resulting from the heat treatment of a batch of substantially pure kaolinic clay at a temperature and for a time interval sufficient to heat the individual particles of clay to a temperature of approximately 1500° F. to 1600° F., with the temperature of the heat treatment for said particular clay being sufficient to develop a physical state of said individual particles that will polish glass with substantially the efficiency of rouge, and below the temperature at which the material resulting therefrom will lose its effectiveness or efficiency as a glass polisher as compared with rouge.

8. A polishing material for glass, said material resulting from the heat treatment of a batch of hydrated aluminum silicate consisting essentially of the mineral kaolinite, for a time interval and at a temperature sufficient to heat the individual particles of said material to a temperature between 1100° F. and 2100° F., the temperature used in said treatment being below that at which the heat will cause an appreciable portion of said material to sinter and lose its effectiveness as a glass polisher as compared with rouge.

LOUIS F. ROWE.
CARL G. SILVERBERG.
ALEXIS G. PINCUS.